United States Patent
Morcom

(10) Patent No.: US 7,319,777 B2
(45) Date of Patent: Jan. 15, 2008

(54) IMAGE ANALYSIS APPARATUS

(75) Inventor: Christopher John Morcom, Broadstairs (GB)

(73) Assignee: Instro Precision Limited, Broadstairs, Kent (GB)

( * ) Notice: Subject to any disclaimer, the term of this patent is extended or adjusted under 35 U.S.C. 154(b) by 714 days.

(21) Appl. No.: 10/474,236

(22) PCT Filed: Apr. 4, 2002

(86) PCT No.: PCT/GB02/01614

§ 371 (c)(1),
(2), (4) Date: Mar. 29, 2004

(87) PCT Pub. No.: WO02/082201

PCT Pub. Date: Oct. 17, 2002

(65) Prior Publication Data

US 2004/0151345 A1     Aug. 5, 2004

(30) Foreign Application Priority Data

Apr. 4, 2001   (GB) ................................ 0108497.9
Apr. 30, 2001  (GB) ................................ 0110577.4

(51) Int. Cl.
   *G06K 9/00* (2006.01)
(52) U.S. Cl. ........................ 382/104; 382/106; 701/301
(58) Field of Classification Search ................ 382/100, 382/104, 106, 211; 348/143, 152; 340/963, 340/964, 971, 973, 555, 641, 956, 982, 985; 701/14, 45, 301
See application file for complete search history.

(56) References Cited

U.S. PATENT DOCUMENTS

| | | | | |
|---|---|---|---|---|
| 5,646,679 A | * | 7/1997 | Yano et al. | 348/47 |
| 6,405,132 B1 | * | 6/2002 | Breed et al. | 701/301 |
| 6,690,268 B2 | * | 2/2004 | Schofield et al. | 340/438 |

FOREIGN PATENT DOCUMENTS

| | | |
|---|---|---|
| EP | 0735512 A2 | 3/1996 |
| JP | 4-201642 | 7/1992 |
| JP | 5-107359 | 4/1993 |
| JP | 6124340 | 5/1994 |
| JP | 7-35849 | 2/1995 |
| JP | 7-98381 | 4/1995 |
| JP | 7-146357 | 6/1995 |
| JP | 8-304540 | 11/1996 |
| JP | 10142331 | 5/1998 |
| JP | 2000-504418 | 4/2000 |
| JP | 2000242896 A | 9/2000 |
| JP | 2001018738 | 1/2001 |

* cited by examiner

*Primary Examiner*—Samir Ahmed
*Assistant Examiner*—Abolfazl Tabatabai
(74) *Attorney, Agent, or Firm*—Blakely, Sokoloff, Taylor & Zafman

(57) ABSTRACT

An Image analysis system uses a multiple-region light detector for detecting light received from the receiving optics, wherein different regions of the light detector can be actuated separately. Control electronics synchronises the timing and direction of illumination of the light source and the actuation of the light detector. The time of light of light signals from the light source to the actuated portion of the detector for all illuminated directions is measured, and distances are derived. A warning is generated if the derived distance is less than a predetermined threshold.

18 Claims, 5 Drawing Sheets

IMAGE ANALYSIS APPARATUS

The present patent application is a non-provisional application of International Application No. PCT/GB02/01614, filed Apr. 4, 2002.

BACKGROUND OF THE INVENTION

This invention relates to image analysis apparatus, particularly for collision warning and and avoidance systems.

The cost of road traffic accidents, both in terms of economics and human misery is vast. For example, in 1999 the US Federal Highway Administration reported 6.3M Road Traffic Accidents (RTA) in the USA which left 3.2M people injured and 41,345 dead. The total economic cost was estimated to be $150 Bn.

Similarly, the Economic Commission for Europe reported that in 1997, European RTA injured 6,118,844 people and killed 164,677. The direct costs of Medical treatment, emergency services, damage to property & lost economic output were estimated to be £36 Bn, whilst the total economic cost to the EEC was estimated at £150 Bn.

Therefore, much research has focussed on finding ways to avoid collisions and RTA by the provision of better driver information and the active and early warning of danger and this has lead to a variety of approaches.

The simplest collision avoidance solutions rely on measuring the distance from the vehicle to the nearest vehicle in front and providing a warning light or sound to the driver if he is driving too close, given his current speed.

One simple approach to measuring distance is to use a laser rangefinder (LRF). These devices work on the basis of measuring the time of flight of a laser pulse to a remote object and back and calculating the distance from the known velocity of light. A limitation of such devices is that they are only able to monitor the distance over a predefined zone directly in front on the vehicle as shown in FIG. 1(A). The path of the vehicle 1 is shown as 2, and the distance monitoring zone is shown as 4. If the vehicle is travelling round a bend, the region being monitored will not be focussed on the vehicle's path, but will look either into the path of oncoming traffic or into the kerbside as illustrated in FIG. 1, situations (B) and (C.).

This is leads to false collision earnings when the road curves or the driver turns which substantially reduces the benefit of such systems and hence their attractiveness to the motorist or commercial driver. In addition, these false warnings make the use of such systems to automatically control vehicle braking, which would otherwise improve vehicle reaction time to dangerous circumstances, problematic.

Nonetheless, simple LRF based approaches can provide a cost effective solution for collision warning or intelligent cruise control systems (where the car velocity is automatically controlled to maintain a safe distance behind the car in front) for motorway driving.

To overcome the problem of false warnings on everyday roads and encourage more widespread adoption of collision warning, many alternative approaches have been tried.

For example, systems have been developed (such as the Eaton® VORAD® system) which use forward looking doppler microwave radar techniques to measure the distance to a number of local vehicles. Unfortunately such systems are expensive to produce because of the sophisticated nature of their components and technology and as a result their application has been limited to the commercial vehicle market where a higher system price can be tolerated because the vehicles are themselves more expensive and the economic cost of a collision is higher.

Other workers have adopted the approach of scanning the laser rangefinder over the scene in front of a vehicle to measure the distance to other vehicles or obstacles. The scanning is usually accomplished with a rotating mirror. However, the mirror needs to be big enough to encompass the laser beam and aperture of the LRF's receiving optics without causing crosstalk or vignetting of the image. This adds cost and mechanical complexity.

To realise a lower cost system other workers have been attempting to use a "sensor fusion" approach, whereby distance data gathered by a LRF or radar is combined with information captured by a video camera and image processing system to try to eliminate false readings. Such systems often use a priori knowledge about the likely size and shape of vehicles and cues from road markings and road furniture to evaluate where the lanes and edges of the road are to check whether the LRF distance data is usable and valid. In addition, some systems modify the video cameras image data to draw the driver's attention to potential threats in the field of view.

However, the road environment is very unstructured from an image processing point of view. This presents a difficult image processing problem requiring substantial and expensive computing resources to extract reliable data. Even with such resources, these systems find it very difficult to cope with unexpected features in the image; for example a child running into the path of the vehicle or some other obstruction in the road, because of their reliance on a priori knowledge. As a result, the high cost of the necessary computing resources and the problem of false warnings has delayed the commercialisation of such systems.

As a further alternative to using laser rangefinding or radar techniques to measure distance to objects over a field of view in front of a vehicle systems using two video cameras and stereographic image processing techniques have been deployed (e.g. JP2001/01873S). However, the baseline of such systems is limited by the size of the vehicle and this compromises range accuracy. In addition, the problems identified above with regard to image processing also apply.

SUMMARY OF THE INVENTION

There is therefore a need for a low cost and reliable image sensing and analysis apparatus using simple technology which is able to measure the distance to objects over a field of view around a vehicle but enabling false and true warnings to be easily distinguished from each other.

According to the invention, there is provided an image analysis system comprising:
  a light source;
  means for illuminating the field of view of interest with the light source;
  receiving optics for receiving light reflected from the field of view to be analysed;
  a multiple-region light detector for detecting light received from the receiving optics, wherein different regions of the light detector can be actuated separately;
  control electronics to synchronise the timing and direction of illumination of the light source and the actuation of the light detector;
  processing means for measuring the time of flight of light signals from the light source to the actuated portion of the detector for all illuminated directions and deriving distances from the times of flight; and means for generating a warning if the derived distance is less than a predetermined threshold.

In this system, selected regions of the light detector can be actuated independently, and the actuation is synchronised with the timing and direction of the light source. The background offset signal is thereby reduced, improving the signal to noise ratio.

The multiple-region light detector can be implemented at low cost as a photo-diode array, for example a linear or 2D array.

The system may further comprise an image capture system capturing an image and displaying the image to a user, the field of view of which is aligned with the field of view of the two dimensional light detector, and means for modifying the image displayed by the image capture system in response to the determined distance.

In this way, the system can be used as a collision avoidance system, with an image modified when there is collision danger. The two dimensional light detector can be used as the detector for the image capture system, so that there is perfect alignment between the image collection system and the distance measurement system, as well as reduction in cost. The photodiode array is then operable in a first mode in which charges are stored on the photodiodes of the array in response to light input and then read out (in conventional manner) to capture image data, and a second mode in which the photogenerated signal from a selected individual photodiode or group of photodiodes is routed to a time of flight measuring circuit to capture range data.

For collision avoidance applications, the system preferably comprises a speed sensor, and means for calculating a safe distance as the predetermined threshold based on the output of the speed sensor. The safe distance may be calculated based additionally on the road conditions, obtained from a road sensor.

When an image capture system is used, the image displayed by the image capture system can be modified when a distance to a region of the image is less than the safe distance.

The system may further comprise means for determining the trajectory of a body carrying the image analysis system, for example based on speed and direction information. When an image capture system is used, the image displayed may then be modified only for regions of the image lying within the trajectory of the body.

The system may comprise a maximal length sequence generator for generating a modulation signal, and a cross-correlator for obtaining the time delay of a time delayed reflected modulation signal from a comparison of the modulation signal and the time delayed reflected modulation signal. In particular, the cross-correlator may comprise:

a coarse cross-correlator for coarsely determining the time delay of the modulation signal needed to maximise the correlation between the time delayed modulation signal and the modulation signal, and
  a fine cross-correlator for calculating the correlation between the time delayed modulation signal and the modulation signal as a function of the time delay of the modulation signal with respect to the received signal in a time delay range around the time shift determined by the coarse cross-correlator.

The use of this cross correlation system enables interference between adjacent systems to be minimised.

BRIEF DESCRIPTION OF THE DRAWINGS

Examples of the invention will now be described in detail with reference to the accompanying drawings, in which.

DETAILED DESCRIPTION OF THE INVENTION

Figure 1:
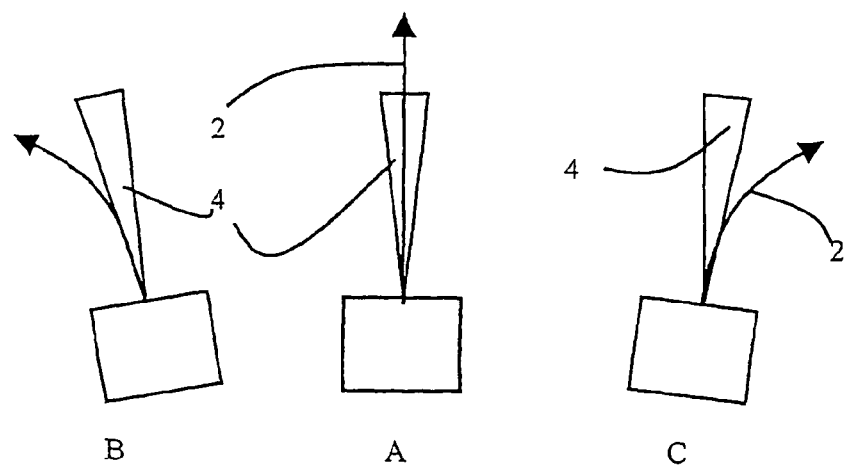
FIG. 1 is used to illustrate some problems with collision avoidance systems.
Figure 2:
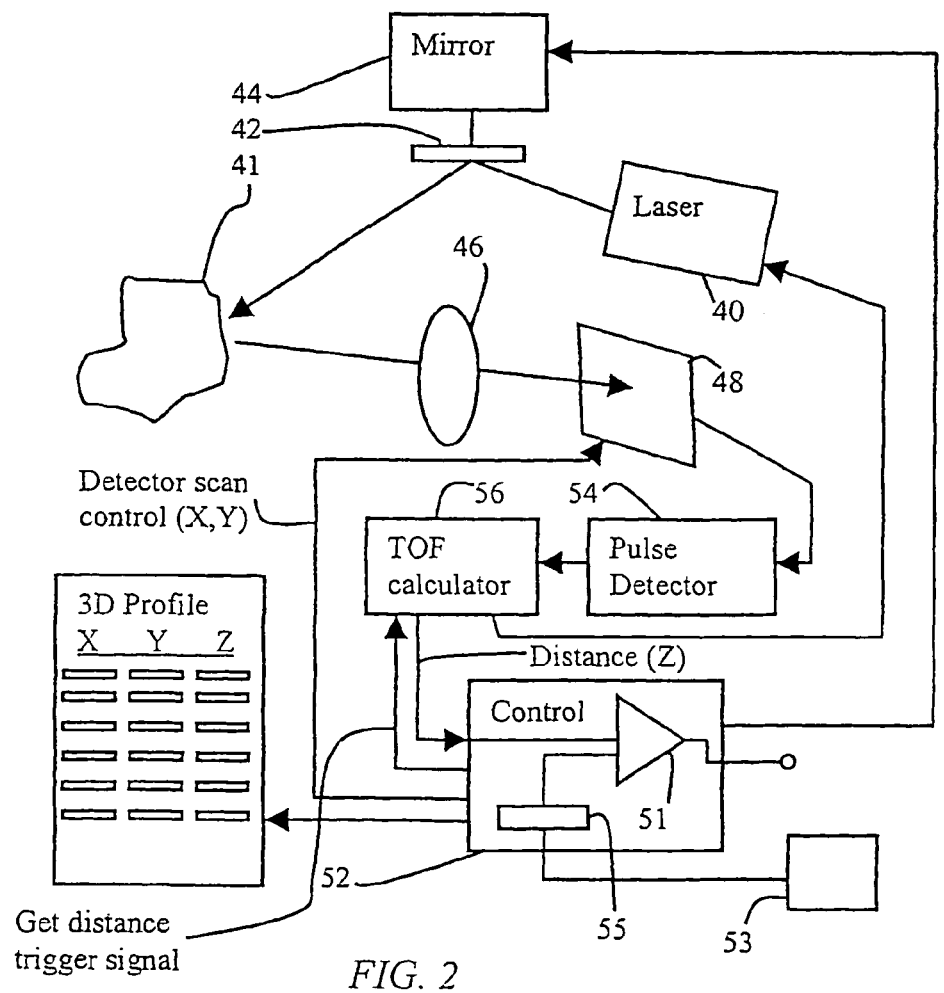
FIG. 2 shows a first example of collision avoidance system of the invention.

The simplest version of the proposed system is illustrated in FIG. 2.

A sequentially pulsed laser beam output from a laser 40 is scanned across the field of view 41. The scanning is achieved either by scanning the laser itself, or preferably using a scanned mirror 42 implemented using known techniques such as galvanometer or piezo-electric drives 44.

A stationary, receiving optical system 46 is arranged to collect all the light from the remote object and focus it onto a photodiode array 48. The photodiode array 48 is connected to a pre-amplifier, pulse discriminator 54 and timing electronics 56.

Control electronics 52 control the scanning of the laser beam in azimuth and elevation (X, Y) and the timing of laser pulsing. Each laser pulse is reflected from objects in the field of view 41, collected by receiving optics 46 and focused onto the photodiode array 48 to generate an electrical pulse, in a part of the array where one part of the object illuminated by the laser spot is focused.

The control electronics apply logic level signals to the relevant X and Y control lines of the X-Y addressed array so that the photodiode illuminated by the image of the laser spot is connected to a pre-amplifier and time of flight detection electronics 56. The reflected laser pulse is captured by this photodiode and the resultant electrical signal routed to the electrical pulse detector and time of flight (TOF) measurement circuitry 56. This computes the TOF of the laser pulse to the spot on the remote object and back to the photodiode on the X-Y addressed array and hence distance from the remote object to the X-Y addressed array.

This process is repeated for many points within the field of view to measure the range of objects within the field of view. If the image formed of the laser spot is larger than a single pixel then the control electronics can cause the detector to address a group of adjacent photodiodes (e.g. a 2×2 sub-array of photodiodes) in parallel to optimise collection and detection of the laser energy.

Because the control electronics 52 is controlling the laser scanning and laser pulse timing, it is able to build up a matrix of numbers comprising the laser scan azimuth (X) and elevation (Y) and the range R(X,Y) to the remote object at that laser line of sight which represents the 3D surface profile of the remote object.

In this system, selected regions of the light detector can be actuated independently, and the actuation is synchronised with the timing and direction of the light source. The background offset signal is thereby reduced, improving the signal to noise ratio.

For collision warning purposes, the distances measured to remote objects within the field of view of the apparatus are compared against a predetermined threshold using a comparator 51 and when the measured distance falls below the threshold a warning is provided, either aurally or optically.

In a preferred embodiment of the system, a speed sensor 53 is provided and a safe distance is calculated in unit 55 based on the output of the speed sensor and the dynamic performance of the vehicle. This safe distance is then used as the threshold point at which a warning is raised. In a further refinement, the safe distance may be calculated based on additional factors including the driving conditions. For example a temperature sensor may be provided so that if the temperature falls below freezing, the safe distance is extended to take account of the potential for ice having formed. Similarly, moisture sensors can determine whether it is raining to extend the safe operating distance.

It can be seen that with the image analysis approach described above, the only moving part of the system is a scanned mirror which only need be sufficiently large to steer the laser beam. This avoids the high cost of a precision motorised pan and tilt head and enables a high scan rate. Furthermore, because the laser and receiving optical paths can be kept completely separate there is no risk of optical crosstalk.

To minimise size and cost, the laser scanning system 44 may be implemented in a number of ways including using electro-magnetically or piezo-electrically scanned mirrors or by mounting a laser chip on a micro-machined silicon or compact piezo electric structure.

It is important to note that for systems which operate over shorter ranges, the scanning can be dispensed with altogether and a pulsed source of light focused so as to illuminate the whole of the field of view. This offers a substantial reduction in system cost and complexity. In this case, the light source may be implemented either using a laser, high power light emitting diode (LED) or array of LEDs.

The performance of the system can be substantially improved by replacing the pulsed laser source with a modulated laser source and the pulse discriminator by a cross-correlation system. Such systems are known, for example, from DE19949803 to Denso Corp. In particular, the system may include a signal source such as a laser for supplying a modulation signal and a transmission system connected to the signal source for transmitting a transmitted optical signal modulated by the modulation signal.

The modulation signal may be, for example a maximal length sequence. In this way, for a given laser peak power, greater energy can then be delivered to the remote object which improves the signal to noise ratio and hence maximum range of the system. A reception system is then be provided for receiving a reflected and delayed version of the transmitted signal, and a cross-correlator for obtaining the time delay. The cross correlator can be arranged to determine, at a coarse resolution, the time delay of the modulation signal needed to maximise the correlation between the time delayed modulation signal and the received signal. The cross correlator can then determine, at a finer resolution than the coarse resolution, the correlation between the modulation signal and the received signal as a function of the time delay of the modulation signal with respect to the received signal in a smaller time delay range around the determined time delay. A measure of distance is calculated from the time delay of the modulation signal needed to maximise the correlation between the time delayed modulation signal and the received signal.

The cross-correlator can be implemented digitally and the sampling frequency of the cross-correlator set to be a multiple of the maximal length sequence generator clock frequency. This oversampling approach enables the distance resolution of the system to be improved; and the efficient signal processing method using coarse and fine cross-correlators minimises the processing power needed.

A further important aspect of this invention is that the use of a modulated signal such as an MLS and the oversampling approach can be used to increase the system's immunity to interference from other like systems being operated by nearby vehicles (e.g. in adjacent lanes). This is because the correlation peak detected in a maximal length sequence (MLS) based TOF system using a specific oversampling factor is insensitive to another MLS signal generated with a different oversampling factor. For example, there is little correlation between a MLS of oversampling factor 5 and of oversampling factor 6, even if the MLS signals are of the same order.

This property can be used to advantage in a collision avoidance context as follows:

a) if a collision avoidance system detects the presence of a reflected signal from an adjacent system using the same oversampling factor, it can switch to a different oversampling factor and/or MLS order to avoid interference between the two systems;

b) alternatively, the system can sequentially cycle through a number of different oversampling factors and MLS orders over time so that the probability of interference between two adjacent systems is much reduced.

For example, the oversampling factor and MLS order could be calculated by a pseudo random number generator which is seeded with a number based on the time the car is started so that the probability of two cars running on the same oversampling factor at the same time would be very small.

The preferred MLS technique outlined above will now be described in greater detail. An M generator generates an MLS signal. The MLS generator clock signal is derived from the system master clock by a divider so that the MLS clock frequency is a known sub-multiple M of the master clock signal. In effect, the MLS is stretched in time by factor M. The "stretched" MLS signal causes the laser to emit an optical stretched MLS signal, the returned signal from the objects in the field of view being digitised and passed to coarse and fine cross-correlation calculation units.

The coarse cross-correlation unit is clocked at the MLS clock frequency and hence correlates a sub-sampled version of the digitised reflected MLS signal and original stretched MLS transmitted signal. The output from this cross correlation unit is a peak which is detected and which indicates the coarse time delay of the reflected signal.

The control electronics then causes the fine cross-correlator to calculate the cross-correlation of the transmitted and reflected signals only in the region of the calculated coarse time delay. Typically, the fine cross-correlation function would be calculated for 2 M samples before and after the coarse time delay. The output of the fine cross correlator is the cross correlation function of the transmitted and reflected signals in the region of the peak.

The shape of the correlation peak for a PRBS signal such as an MLS is a triangular pulse. The cross-correlation operation may be viewed as being similar to convolving the MLS with a delayed version of itself and then sampling the result at a frequency equal to the cross correlator clock frequency. Therefore, the shape of the correlation peak output by the cross-correlation unit is given by the convolution function of two identical pulses of width T, which is a triangular pulse sampled by the cross correlator clock frequency.

The image analysis apparatus also provides the azimuth and elevation of those points within the field of view which are nearer than the safe distance threshold and this information can be used to give an indication to the driver of where the potential collision may arise. For example, one of an array or light emitting diodes may be illuminated.

However, the system may be refined farther by combining the image analysis apparatus described above with a video camera as shown in FIG. 3. A video camera 10 and the image analysis system, which is in effect a real-time 3D surface profile measurement system 12 are arranged so that their fields of view 14, 16 are co-incident and aligned with the road ahead. The video camera has a video output providing an intensity signal I(X,Y) for each point in the field of view and the image analysis system has an output indicating the range R(X,Y) to each point in the field of view. Control circuitry 18 generates sync pulses to ensure that the scanning of the video camera 10 and 3D surface profile measurement system 12 are synchronised; so that the same point in the field of view is viewed by each system at the same time.

A vehicle velocity sensor 20 measures the vehicle velocity and the safe distance (Rmin) is computed in processor 22 taking into account the vehicle brake performance and driver reaction time. A comparator 24 compares the measured distance at each scanned point in the field of view R(X,Y) with the safe distance Rmin and generates a signal whenever the measured distance to a point within the field of view is less then the safe distance (R(X,Y)<Rmin). This signal may be used to trigger warning means provided by audio output 26.

In addition, the warning signal operates an overlay switch 28 which replaces the current intensity value I(X,Y) of the pixel being readout from the video camera with an alternative preset warning colour generated by a separate source 30; e.g. red. In this way, those areas or objects within the field of view of the video camera which are dangerously close are highlighted in the video signal.

The video signal is then displayed to the driver through a conventional video screen or head up display 32, and the highlighting indicates to the driver which objects or vehicles are too close.

Figure 3:
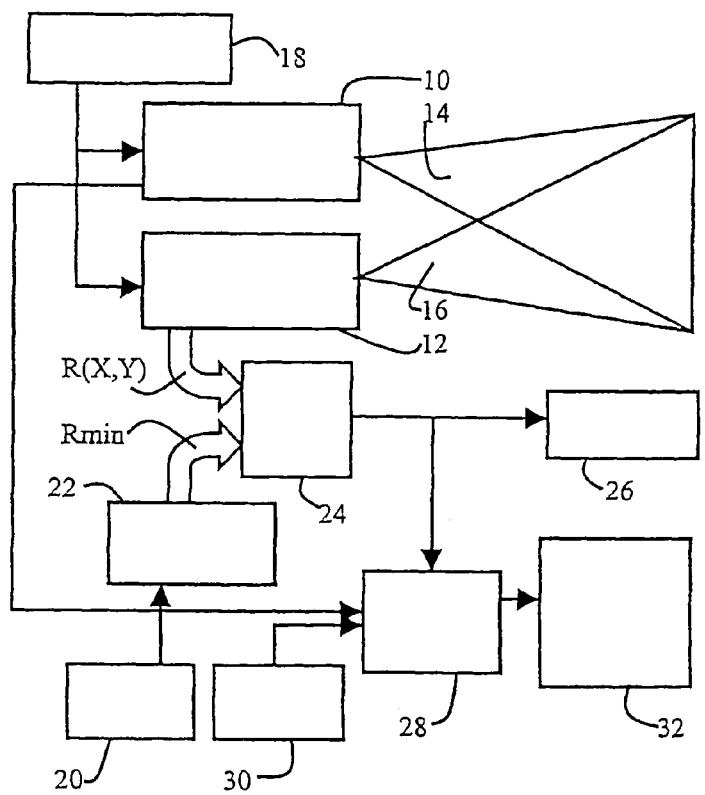
FIG. 3 shows a second embodiment of system of the invention.

FIG. 3 shows separate LRF and video imaging systems 10, 12. A particular benefit of the approach described here is that it is instead possible to simplify the design of the video camera and the surface profile measurement system, in particular by sharing the light receiving hardware. A combined video and profile measurement system can be implemented by the system of FIG. 2, and the way in which such a system can be operated will now be described. A system will then be described in more detail with reference to FIG. 5.

Figure 4:
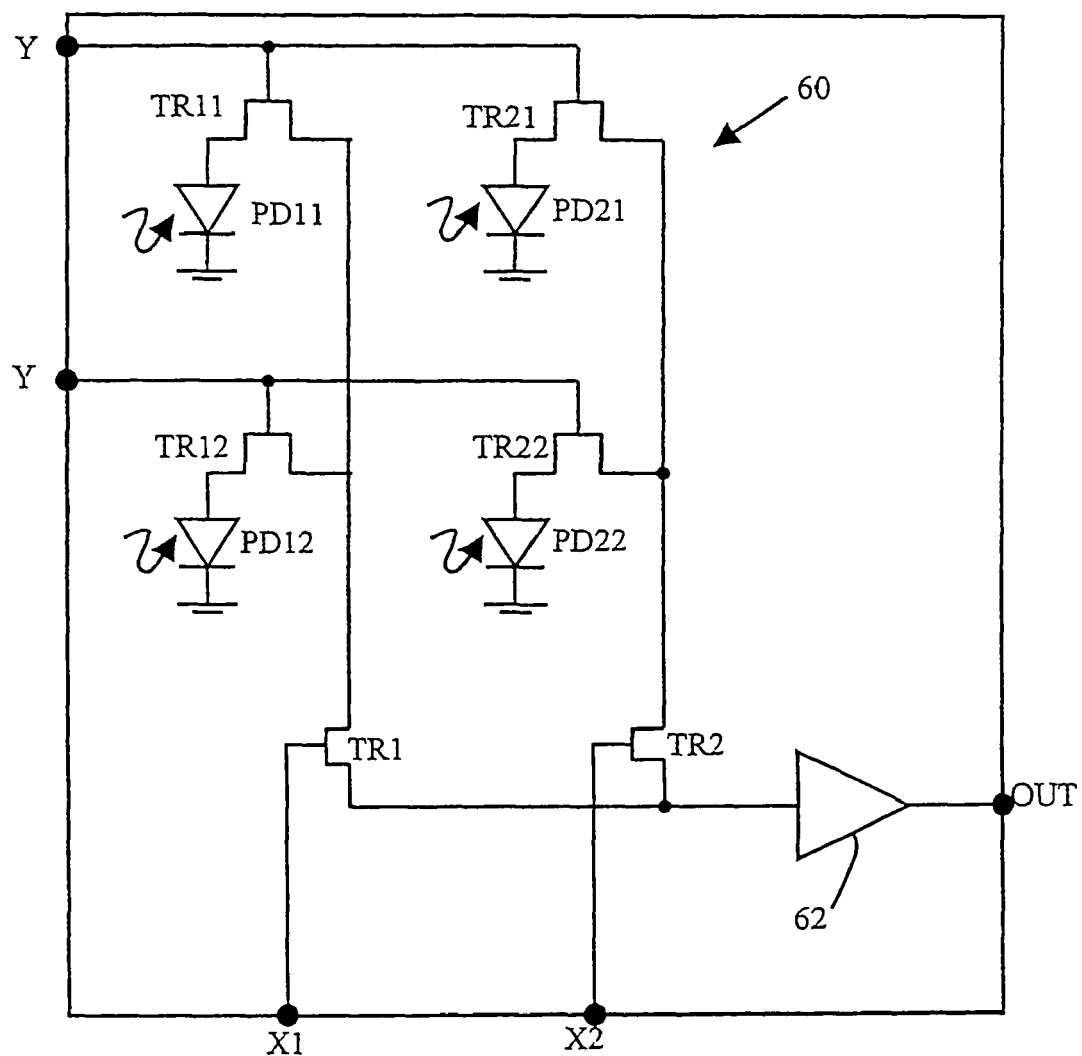
FIG. 4 shows the photodiode array of FIG. 3 in more detail.

The photodiode array of the LRF system may be used as the image acquisition system for the video camera. A simplified schematic of one possible design of a photodiode array for this purpose is shown in FIG. 4. A 2×2 array is shown for simplicity, whereas a much larger array will be used in practice. The device consists of an array of photodiode pixels 60, each of which comprises a photodiode (PD11 to PD22) and associated transistor (TR11 to TR22), which are configured and drive to act as analogue switches.

For standard video imaging applications, the device is operated in an integration mode where incident illumination is focussed upon its surface. The incident illumination generates charge within each photodiode by the photoelectric effect. During this integration period, connections X1, X2, Y1 and Y2 are all held low so that all transistors are off and the photodiodes are electrically isolated. The photo-generated charge then accumulates in each photodiode and is stored on the self-capacitance of the photodiode.

Once sufficient photocharge has been collected, the device is readout as follows. Input X1 is taken to a high potential so that TR1 is turned on thereby allowing charge to flow between the column and a charge sensitive amplifier 62. Then input Y1 is pulsed high for addressing a row of pixels, turning TR11 on and allowing the photo-generated charge stored on photodiode PD11 to flow through TR11 and TR1 to the output amplifier 62 where the charge is converted to a voltage. This creates an output signal whose amplitude is proportional to the level of charge stored on PD11 and hence the level of light incident on TR11.

After the self capacitance of PD11 has been discharged, input Y1 is taken low and input Y2 is taken high, allowing the stored charge on PD12 to be readout. In this way, a column of pixels is read out in turn.

After all the charge collected by PD12 has been discharged, Y2 is taken low and X2 is taken high to allow PD21 and PD22 (the pixels in the next column) to be readout sequentially by pulsing Y1 and Y2 in the manner described above.

It can be seen that this process allows the 2×2 array to be scanned and an electrical signal that is the analogue of the incident illumination generated. In normal operation, larger numbers of photodiode are used. e.g. 512×512, to increase resolution. The readout sequence and sensor scanning can be arranged to generate a standard video signal.

In addition, it may be noted that the basic structure described here has been simplified for the purpose of describing the proposed invention. Practical X-Y addressed photodiode arrays are generally fabricated as single complementary metal oxide semiconductor (CMOS) large scale integrated circuits (LSI) which include many refinements such as on-chip clock circuitry to generate the pulse sequences for electrodes X1 to Xn and Y1 to Yn on-chip and additional pixel and/or column level circuitry improve amplification and detection of the photo-charge.

For 3D profile measurement; the X-Y addressed photodiode array can be utilised not in an integrating mode, but as a multiplexer, whereby only the individual photodiode receiving the reflected image of the laser spot on the remote object is addressed, as discussed above. When only one or a small number of the photodiodes is connected to the receiving amplifier and time of flight electronics at any one time, the background offset signal will be limited to that generated by the part of the field of view focussed onto the individual photodiode/photodiode group, rather than from the whole of the field of view of the optics. This aspect of the invention improves the signal to noise ratio of the system, by reducing the effect of background signals and hence reducing the shot noise associated with the background signal.

In a preferred embodiment, the X-Y sensor, time of flight measurement system and control electronics are fabricated on a single integrated circuit to minimise manufacturing cost. The photodiodes can be manufactured and operated as avalanche photodiodes to provide signal amplification by the avalanche effect, prior to signal detection.

The laser scanning pattern will often be a repeating pattern arranged to cover the optical field of view whilst providing adequate time resolution to measure the position of moving objects in the field of view. The pattern is typically arranged as a conventional raster scan for ease of display on conventional monitors. However, it can be seen that other patterns may be used. One useful pattern is a spiral scan pattern where by controlling the velocity of the laser scan, increased spatial resolution may be achieved in the centre of the scan whilst still maintaining a low spatial resolution to detect objects appearing at the periphery of the scan.

In order to operate the array in a normal imaging mode, rather than a multiplexed time of flight detector mode, the sequence of pulses applied to the X-Y addressed array is returned to a conventional video scanning sequence. In order to enable the two systems to operate continuously, a combined scanning sequence will be applied which can, for example, provide a range finding operation and an imaging operation in alternate frames. By toggling the system between capturing a 3D scan and a conventional image scan both a video image sequence and 3D sequence can be captured and overlaid on one another.

The use of the photodiode array in two different modes enables the operation to be optimised for each mode. For the LRF operation, it is important that only the photodiode or local group of photodiodes receiving the image of the laser spot at any point in time are addressed; i.e. that the laser scanning and the photodiode array scanning are synchronised. This would normally require extremely precise calibration of the scanner and optical system. However, if the laser is scanned whilst the sensor is in an imaging mode, an image of the laser path can be collected by the control electronics. This image can be used to determine the precise path of the laser beam image on the surface of the photodiode array and hence set up the correct addressing sequence for the X-Y addressed array and/or laser pulsing sequence, to ensure synchronisation in the multiplexed time of flight detector mode. Thus, the normal addressing mode is used as a calibration stage for the higher performance multiplexing mode. In effect, the system can be self calibrating which is a major benefit for systems which have to operate over large temperature ranges.

To those skilled in the art, it can be seen that there are a variety of ways of interleaving video image capture and 3D surface profile measurement. For example, the clocking of the photodiode array could be arranged such that alternate pixels, groups of pixels or lines could be used for image capture and surface profile range capture. With these alternative approaches, a mosaic or stripes of infra red bandpass filters can be applied to the surface of the photodiode array aligned with those pixels or lines which are to be used for range measurement to improve discrimination of the laser illumination against background illumination and hence to increase range.

Because the same detector is used to capture a 3D surface profile and standard image, the registration between the standard image and 3D data is near perfect and this significantly increases the effectiveness of techniques whereby the captured image is modified in response to the varying distance to points within the field of view.

Various rules may be applied to determine when the video image should be modified to provide a warning signal. In a preferred embodiment, vehicle velocity is used to calculate a number of different distance limits representing different safety margins. Additional comparators and overlay switches are provided to colour code the video signal depending upon the category. For example, Red could be used to indicate that the object is so close as to be dangerous and orange could be used to indicate that additional care needs to be taken. Flashing of parts of the display may also be used as a warning.

Hence, by colour coding the driver display, the driver is able to identify the risk posed by different objects and, because the driver is able to correlate the collision warning with an object in the field of view, is able to determine whether it is a false warning or not.

The system may be improved further by providing additional sensors to monitor other important factors such as the road temperature, whether it is raining and road surface moisture level. These factors would be used to refine the safe distance to take into account road and environmental conditions and the modify the colour coding of the warning display accordingly.

Preferably the 3D surface profile measurement system operates at near infra red wavelengths to maximise penetration and range, even in the presence of rain, snow or fog.

It can also be seen that this system could be deployed not only to the front of the vehicle, but also to the side and rear of the vehicle to provide all round warnings to the driver. If used to the sides of the vehicle, the collision warning system could be employed as an active side view "mirror", where objects which pose a threat if the driver is to change lane are highlighted. A further advantage is that the camera/3D image analysis system can be positioned to eliminate the usual door mirror blind spot.

Figure 5:
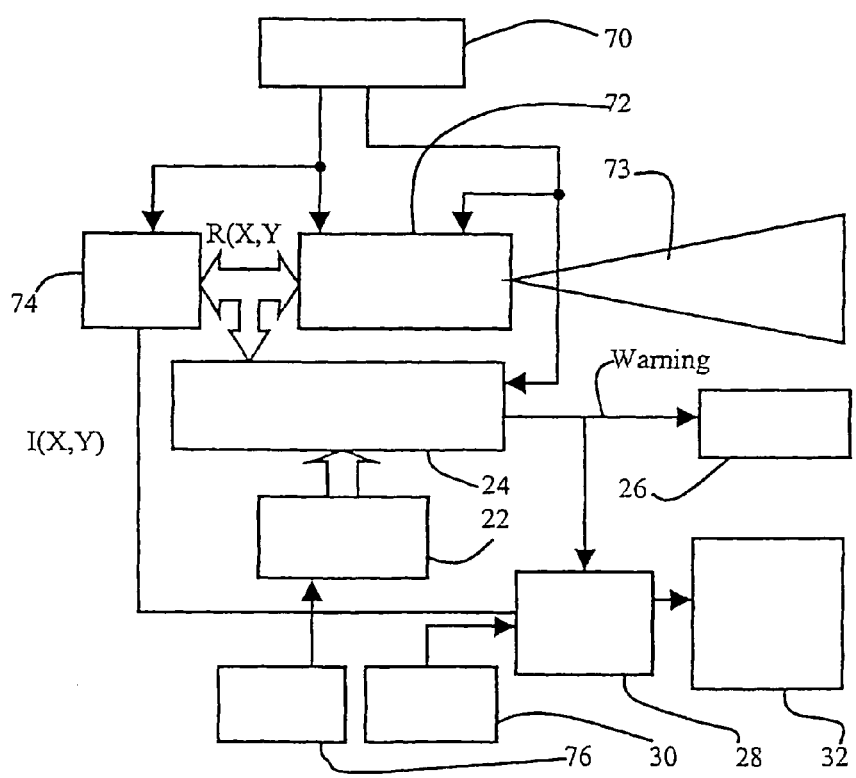
FIG. 5 shows a third embodiment of system of the invention.

FIG. 5 shows a system which can use the combined imaging and range finding approach described above. The same reference numerals are used as in FIG. 3 for the same components.

A synchronisation control circuit 70 switches the combined sensor 72 (with a single field of view 73) sequentially between imaging and 3D surface measurement modes. During the imaging mode, the image data is readout in the normal manner and stored in a frame buffer 74; i.e. the image data is stored in a block of memory.

During the 3D scanning mode, the stored image data is readout from the frame buffer 74 in synchronism with the 3D surface profile data. The surface profile data is compared with the computed safe distance criteria from the processor 22, which receives vehicle velocity and road condition data from sensors 76. There may be a number of levels, for example ranges defined as critical, preferred or safe, as shown in FIG. 5. The stored image data is colour coded for display in the manner described above, using colours from the source 30 and an overlay unit 28.

An alternative but equally effective implementation would be to store the 3D data in a frame buffer and read the 3D data out in synchronism with the image data. In either case, the range measurement and visual image acquisition are carried out in sequence, and one of the sets of data is stored, so that the two sets of data can be combined in order to drive the display.

In a preferred embodiment, all of the collision warning system circuitry would be integrated into a large scale integrated circuit which also includes the photodiode array and associated circuitry used for the imaging/surface profile measurement sensor system. This is to minimise manufacturing cost.

In summary, the simple collision warning systems described above will colour code all objects within the field of view which are too close to the vehicle so that the driver can exercise judgement over which objects are threats and take the necessary avoidance action, which is a significant improvement over existing systems, which provide a warning of potential collision, but do not enable the driver to understand where the potential threat comes from.

However, some objects will be inevitably be coded as being too close whilst not posing threat of collision.

Examples include objects on the pavement or on the other side of the road. To overcome this issue, the basic system can be improved as described below.

Figure 6:
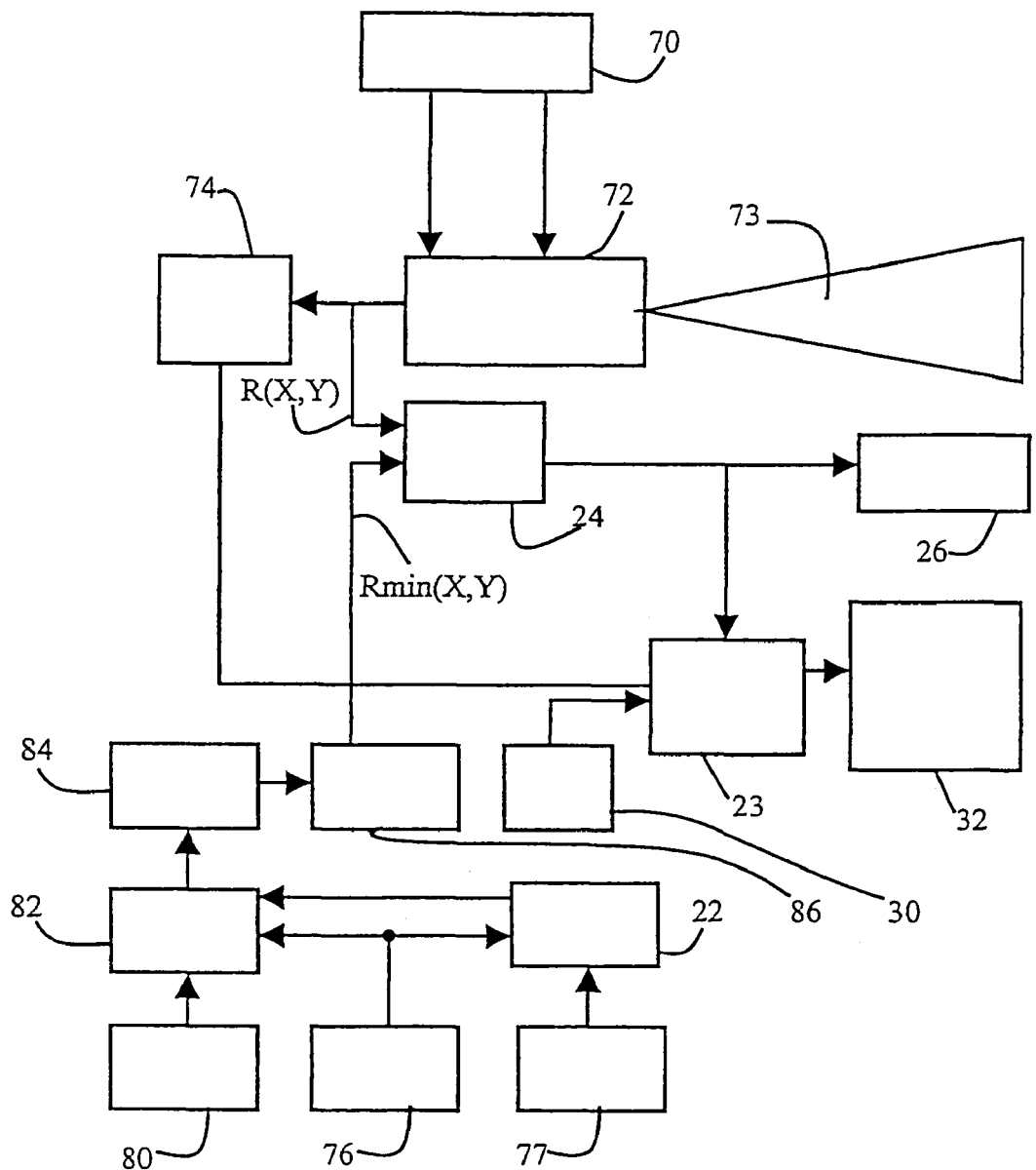
FIG. 6 shows a fourth embodiment of system of the invention.

The basic systems described above can be improved by modifying them as shown in FIG. 6. Again, the same reference numerals are used as in FIG. 3 or 5 for the same components. The system of FIG. 6 differs in the way the safe range is calculated.

A gyroscope 80 or other sensor capable of detecting the turning motion of the vehicle is used (for example a steering column encoder).

The turning vector, and vehicle velocity vector from sensor 76 and knowledge of the vehicle size are used to calculate the vehicle trajectory and hence the outside perimeter of the projected swept volume of the vehicle using standard equations of motion. This is carried out by vehicle trajectory calculation unit 82, The velocity sensor 76 and road and environment sensors 77 are used to compute a safe distance limit in the normal manner in the processor 22.

Figure 7:
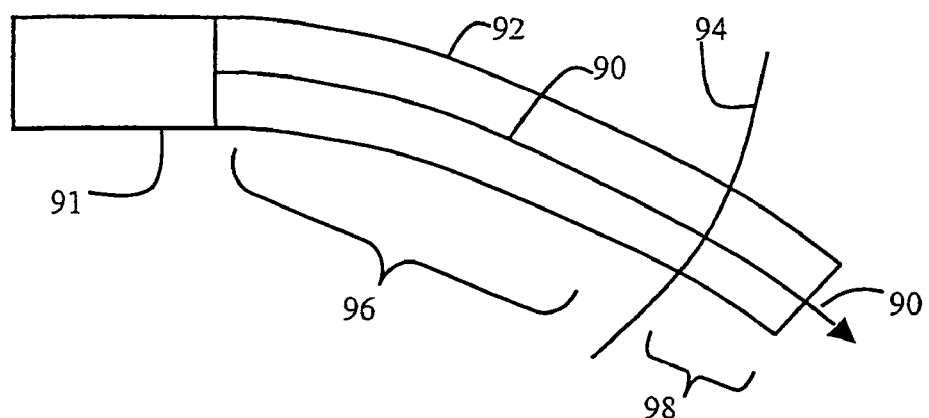
FIG. 7 shows how trajectory information can be used.

The safe distance limit from the processor 22 is then combined with the projected swept volume from unit 82 to define an unsafe volume zone as illustrated schematically in two dimensions in FIG. 7. FIG. 7 shows the vehicle trajectory 90 of the vehicle 91 which defines a volume zone 92. A safe distance limit 94 divides the volume 92 into a region 96 close to the vehicle and a region 98 at a safe distance.

Typically, the unsafe volume zone is computed in a Cartesian co-ordinate system with the front of the vehicle (or the vehicle centre of mass) positioned at the origin. The unsafe volume zone is calculated by unit 82. However, the 3D surface profile measured by the surface profile and image system is a matrix of numbers which represent the distance to points in the field of view (the "real world") along lines projected from the each pixel on the surface of the photodiode sensor array via the perspective centre of the lens. As the geometry of the optical system of the 3D surface profile measurement system is known, then using the standard mathematical rules of central perspective a co-ordinate transformation function can be computed in unit 84 to transform co-ordinates in the Cartesian system used to compute the safe volume zone to those in field of view of the scanning system. This enables a volume map in the coordinates of the scanning system to be built up in unit 86.

With adequate control-over the optical system tolerancing, this function need only be computed or measured once using standard photogrammetric calibration techniques and then pre-programmed into each system.

During operation, the co-ordinate transformation function is used to transform the Cartesian co-ordinates of the perimeter of the safe volume zone to the "real world" co-ordinate system measured by the 3D surface profile measurement system.

The comparator 24 can then compare the measured 3D surface profile as it is read out with the unsafe volume zone and determine whether any object in the field of view falls within the perimeter of the unsafe zone. If it does an audible warning may be sounded and the potentially dangerous part of the field of view highlighted on the video image in the same manner as described above.

With this improved system, only those parts of the 3D surface profile data that fall within the projected unsafe volume 96 are considered, and hence only those objects that pose a threat of collision will be highlighted, substantially reducing the possibility of false warnings.

This approach has a further benefit in that because only the perimeter of the unsafe zone needs to be computed and transformed into the 3D surface profile co-ordinate system, rather than the whole image region, computation time is minimised. However, those skilled in the art will realise that alternative implementations are possible based on the basic principles outlined above. For example, the 3-D surface profile could be transformed into the Cartesian co-ordinate system of the vehicle and the comparison of the surface profile and unsafe volume zone made in Cartesian co-ordinates.

A preferred embodiment for a lower cost implementation is to apply the approach described above to a 2D surface profile captured from a horizontal plane which is parallel to the road surface at a height chosen to intersect other vehicles and potential collision threats, while not intersecting the road.

Whilst this does not give height data, which may be important in some applications, it does simplify the computational requirements and as the 2D surface profile can be gathered by taking the surface profile data from a single row (or a group of adjacent rows) of photodiodes in the surface profile/imager system, the optics of the pulsed/modulated illumination can be simplified so that the illumination is focussed into that horizontal plane, rather than over the whole field of view. These factors simplify the overall system implementation and reduce cost.

Another implementation uses the unsafe zone projection to control the operation of the 3D surface profile measurement system so that the 3D profile measurement is limited to the part of the field of view within the projected unsafe zone. This approach may be used to speed up the 3D surface profile measurement process, by reducing the number of points to be measured or may be used to extend the measurement time per measured point to improve signal to noise ratio and hence maximum range.

A number of unsafe volume maps can be generated, representing different degrees of risk and multiple comparators used to colour code the video image by the level of risk.

In the systems described above, the projected path of the vehicle is computed using information from a gyroscope or steering wheel sensors and velocity sensors. This is used to compute the anticipated swept volume of the vehicle path which is transformed into the co-ordinate system of the measured surface profile.

Figure 8:
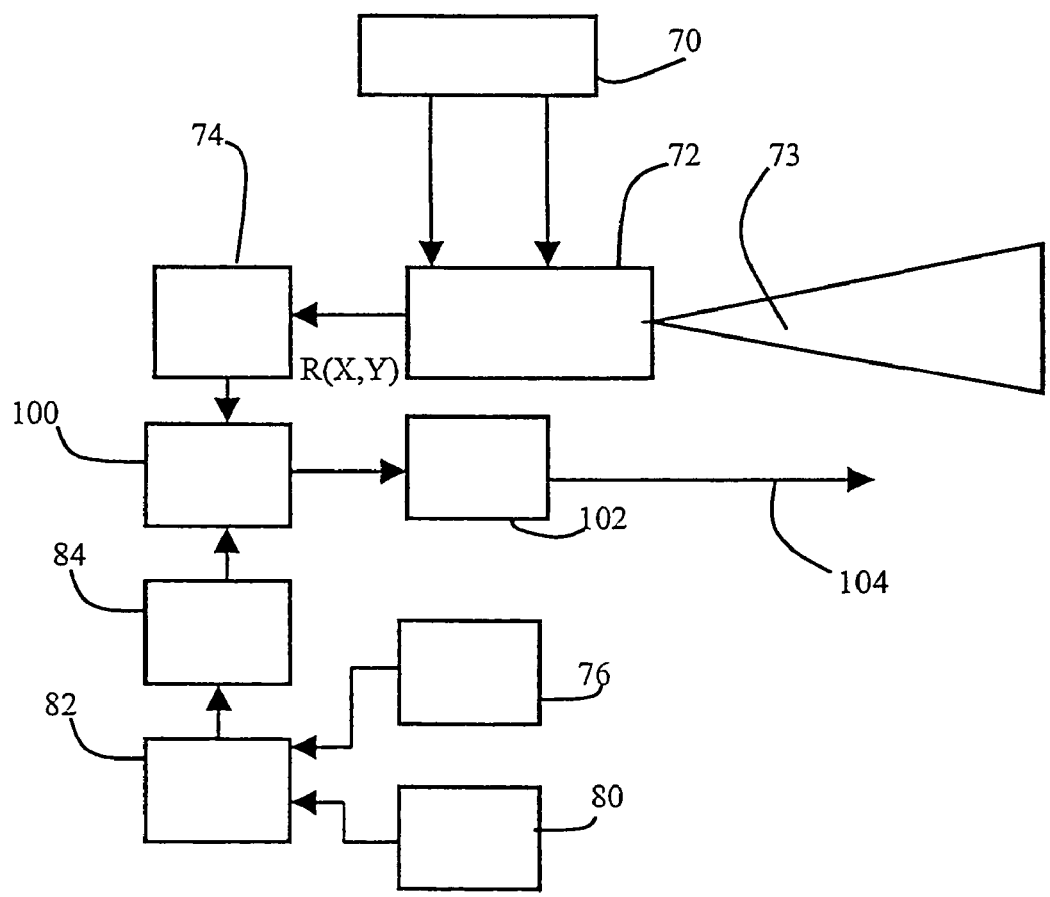
FIG. 8 shows a fourth embodiment of system of the invention.

FIG. 8 shows a modification in which instead of a simple comparison operation, the surface of intersection of the measured real world surface profile and anticipated swept volume of the vehicle path is computed, so that the distance from the vehicle to the nearest object along the projected vehicle trajectory can be extracted from this intersection surface. This parameter can then be output from the system and used by automatic systems to control the vehicle velocity so as to avoid a collision or minimise the impact. In other words, this modification enables the proposed system to be used as a collision avoidance sensor.

The system of FIG. 8 again comprises a combined sensor controlled with sychronisation control 70. The buffer 74 stores the 3d profile (i.e. range) data, and is used to calculate whether any object in the field of view intercepts with the projected volume of the vehicle. This is determined in unit 100, which in turn enables the distance to the nearest point within the projected volume to be calculated, in unit 102. An output 104 is provided which indicates the distance to the nearest object in the projected vehicle volume.

The projected vehicle volume is obtained in the same manner as described above, namely using a gyroscope 80, speed sensor 76, trajectory calculation unit and coordinate transformation unit 84.

One simple approach to computing the distance to the nearest object would be to sequentially step a projection of a surface equivalent to the frontal area of the vehicle along the anticipated vehicle trajectory until an intersection with the measured surface profile is found. Another approach would be to carry out a binary search, whereby the projection of the frontal area of the vehicle is set at a point 40 m along the anticipated vehicle path, if the projection is behind the measured surface then the projection of the frontal area of the vehicle is set at 20 m and so on, until the distance to the nearest point of intersection is known.

It can be seen that a dual purpose system can be constructed by combining FIG. 8 and FIG. 6 which would provide rapid feedback of the distance of the nearest object in the path of the vehicle for automatic vehicle control with a collision warning to the driver.

The invention claimed is:

1. An image analysis system comprising:
a light source;
means for illuminating a field of view of interest with the light source;
receiving optics for receiving light reflected from the field of view to be analysed;
a multiple-region light detector for detecting light received from the receiving optics, wherein different regions of the light detector can be actuated separately;
control electronics to synchronise the timing and direction of illumination of the light source and actuation of the light detector;
processing means for measuring a time of flight of light signals from the light source to the actuated portion of the detector for all illuminated directions and deriving distances from the times of flight;
means for generating a warning if the derived distance is less than a predetermined threshold; and
an image capture system configured to capture an image and display the image to a user, the field of view of which is aligned with the field of view of the two dimensional light detector, wherein the two dimensional light detector is used as the detector for the image capture system.

2. A system as claimed in claim 1, further comprising a speed sensor, and further comprising means for calculating a safe distance as the predetermined threshold based on the output of the speed sensor.

3. A system as claimed in claim 2, further comprising a road condition sensor, and wherein the safe distance is calculated based additionally on the road condition sensor output.

4. A system as claimed in claim 1, further comprising means for modifying the image displayed by the image capture system in response to the derived distance.

5. A system as claimed in claim 4, wherein the image displayed by the image capture system is modified when a distance to a region of the image is less than the predetermined threshold distance.

6. A system as claimed in claim 5, wherein the image displayed by the image capture system is modified by changing the colour in parts of the image displayed corresponding to selected regions of the image to be analysed.

7. A system as claimed in claim 1, further comprising means for determining the trajectory of a body carrying the image analysis system.

8. A system as claimed in claim 7, wherein the trajectory is obtained from speed and direction information.

9. A system as claimed in claim 7, further comprising means for determining the distance to the nearest object within the trajectory.

10. A system as claimed in claim 1, further comprising means for determining the trajectory of a body carrying the image analysis system, and wherein the output for modifying the image displayed by the image capture system is created only for regions of the image to be analysed lying within the trajectory of the body.

11. A system as claimed in claim 1, wherein the multiple region light detector comprises a linear or two dimensional photodiode array.

12. A system as claimed in claim 11, wherein the photodiode array is operable in a first mode in which charges are stored on all photodiodes of the array in response to light input and read out to capture image data, and a second mode in which the signals from selected individual photodiodes or sub-groups of photodiodes are routed, in a sequence, to the processing means.

13. A system as claimed in claim 1, further comprising a maximal length sequence generator for generating a modulation signal, and a cross-correlator for obtaining the time delay of a time delayed reflected modulation signal from a comparison of the modulation signal and the time delayed reflected modulation signal.

14. A system as claimed in claim 13, wherein the cross correlator further comprises:
means for determining, at a coarse resolution, the time delay of the modulation signal needed to maximise the correlation between the time delayed modulation signal and the modulation signal,
means for determining at a finer resolution than the coarse resolution, the correlation between the time delayed modulation signal and modulation signal as a function of the time delay of the time delayed modulation signal with respect to the modulation signal in a time delay range around the determined time delay, and
means for outputting a measure of distance calculated from the time delay of the modulation signal needed to maximise the correlation between the time delayed modulation signal and the modulation signal.

15. A system as claimed in claim 13 or 14, wherein the cross-correlator comprises:
a coarse cross-correlator for coarsely determining the time delay of the modulation signal needed to maximise the correlation between the time delayed modulation signal and the modulation signal, and
a fine cross-correlator for calculating the correlation between the time delayed modulation signal and the modulation signal as a function of the time delay of the modulation signal with respect to the received signal in a time delay range around the time shift determined by the coarse cross-correlator.

16. A system as claimed in claim 15, wherein the ratio of coarse cross correlator and fine cross-correlator operating frequencies is adjusted to minimise interference between adjacent systems.

17. A system as claimed in claim 15, wherein the coarse cross correlator is clocked at a first frequency and the fine cross-correlator is clocked at a higher second frequency.

18. A system as claimed in claim 13, wherein the parameters of the maximal length sequence and cross-correlator are adjusted to minimise interference between adjacent systems.

* * * * *